Jan. 1, 1957  J. FISCHER  2,775,919
REARVIEW MIRROR
Filed June 28, 1954
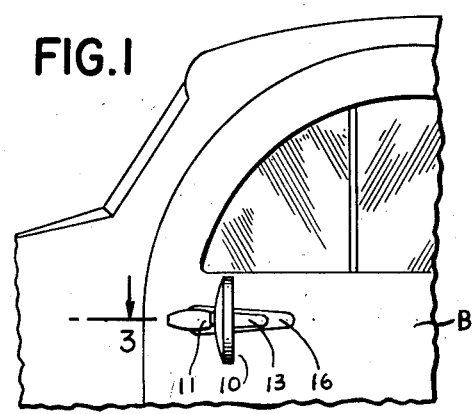
FIG.1
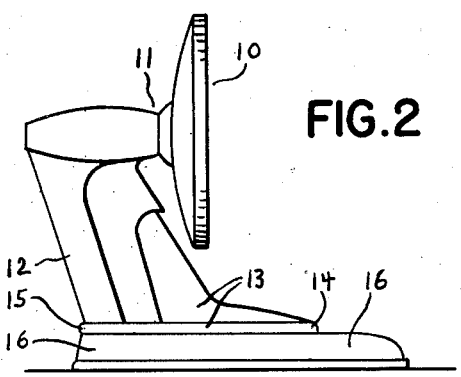
FIG.2
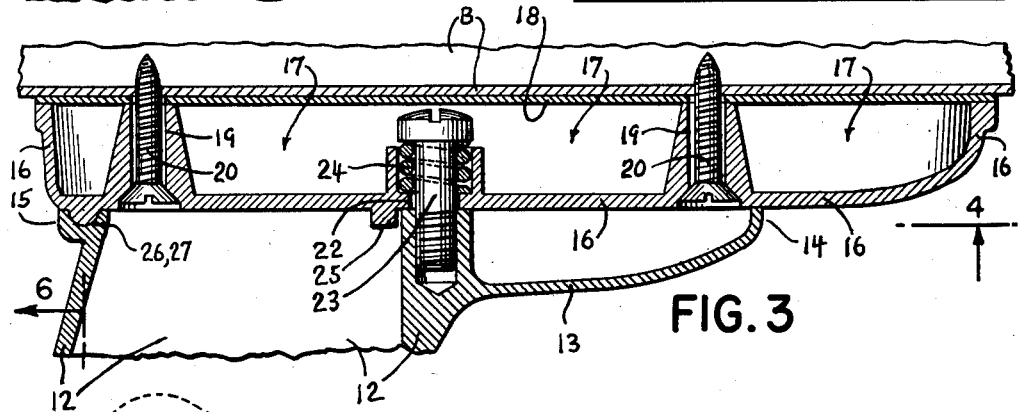
FIG.3
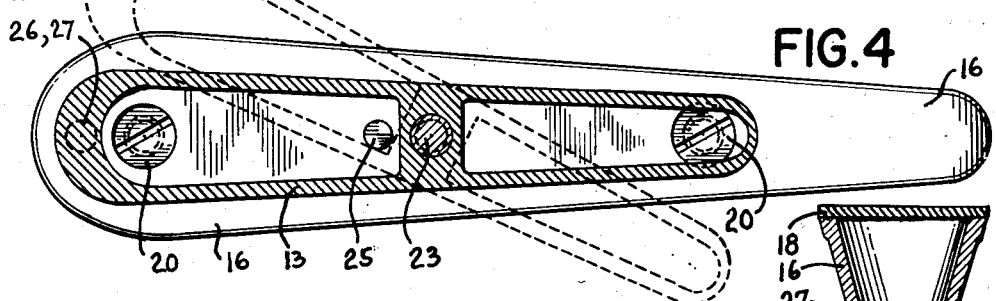
FIG.4
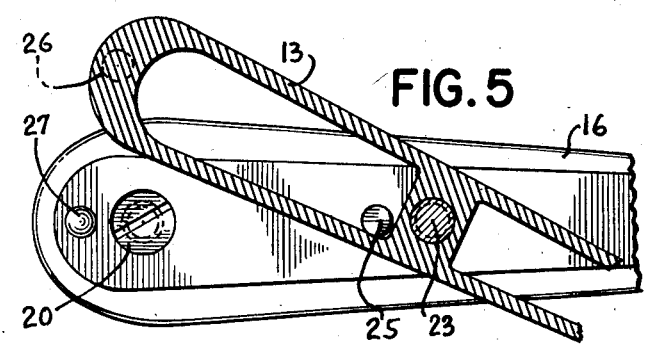
FIG.5
FIG.6
INVENTOR.
JOSEPH FISCHER
BY James C. Ledbetter
ATTORNEY United States Patent Office 2,775,919
Patented Jan. 1, 1957

2,775,919

REARVIEW MIRROR

Joseph Fischer, Pelham Manor, N. Y.

Application June 28, 1954, Serial No. 439,599

7 Claims. (Cl. 88—98)

This invention relates to new and useful rearview mirrors and more particularly to a new bracket means for mounting a mirror on the body of a car or other automotive vehicle.

The invention is proposed as a simple and convenient means in further solving the problem not only of installing mirrors on cars with a resulting neat finish not always accomplished heretofore but also solving a problem in manufacture by which to achieve increased economy. These points are believed to benefit the car manufacturer when installing mirrors as original equipment as well as the accessory stores when selling mirrors for subsequent installation.

In accordance with my experience in this art and supplying the trade with rearview mirrors over a period of years, there is need for ways and means for installing rearview mirrors on cars with outside attaching means (such as screws) which are concealed; and this invention relates to new means for attaching the base or bracket of the mirror on a car body, concealing the outside attaching means such as screws, and doing so without the necessity of working on or from the inside of the car or from the side opposite to and on which the mirror is mounted.

Accordingly, it is the purpose of this invention to carry out the foregoing improvements—thus in purpose providing a new and useful rearview mirror combination having a new mode of operation to facilitate its installation, a mirror which may be easily installed by a mechanic working entirely from the outside of the car or other member on which the mirror bracket or mounting means is attached and also to provide improvements in screw attaching means which does not require the mechanic to reach into the inside of the car, or work from the other side of the member on which he is mounting the mirror, and yet conceal the outside screws to thus provide a final installation having all the refinement and appearance of a mirror which is screw mounted from the inside of the car body.

A further purpose is to produce a rearview mirror which is economical to manufacture, by forming its bracket means (arm and base) in two parts which are so related as to have the appearance of a single part; whereby the base part is standard but the arm part may be varied in design for different trade requirements; and whereby the two-part feature per se characteristically provides the new means herein for neatly-concealed outside-screw installation for the benefit of the car manufacturer as well as the retail accessory trade.

The drawings

This specification and its claimed subject matter, with the accompanying drawings, disclose the invention as preferred and embodied at this time for an understanding of the problems sought to be solved. Since the teachings herein may suggest changes to others who wish to avail themselves of the benefits of the invention, it will be appreciated that subsequent modifications hereof may well be equivalent in form and hence the same in spirit and principle as this disclosure.

Fig. 1 is a diagrammatic view of this new rearview mirror bracket means shown in small scale, installed on the outside of a car body, and on the left front door of the car.

Fig. 2 is a side elevation of the mirror (enlarged over Fig. 1) before mounting it on the car. This view shows a stationary mounting base, with a swingable foot blended in appearance into the base as if in one piece therewith, also an arm or leg extending from the swingable foot, and a mirror head on the outer or upper end of the arm. The base is in one piece and may be of standard form, while the arm with its foot is also in one piece but may be manufactured in a variety of design appearances to suit the tastes and requirements of the automotive trade. It is seen that the two-piece bracket means in Fig. 2 has the appearance of a single member.

The next views are details made to an enlarged scale, omitting the mirror, in order to better show the novel parts, including a spring tensioned pivot and detent latching means between the stationary base and swingable foot, which provides a new combination having a new mode of operation and utility in a mounting means for installing the rearview mirror on the car body.

Fig. 3 is an enlarged longitudinal section looking down on the line 3 illustrating the inside detail construction of the stationary base which is shown screw fastened to the car body in finally installed position, with the swingable foot resting in its final position in alignment on the base and thus covering the screw fastenings (two being shown screwed into the sheet metal car body), and the mirror arm is broken away where it extends outward from the swingable foot on the screw fastened base.

Fig. 4 is a longitudinal section on the line 4, with the swingable foot shown in dotted-line position swung at an angle to the stationary base for temporarily uncovering and exposing the fastening apertures, into which have been inserted the fastening screws extending through the top flat surface of the base inward toward and into the car body. Two self-tapping screws are shown as having been inserted and screwed fastened from the outside into the sheet metal car body or car door, while the foot was in dotted-line position, after which the foot has been swung back into permanent position (as shown in cross section) and hence into longitudinal alignment with and on the flat top of the long base in final position to conceal the outside screw fastenings.

Fig. 5 is a fragmentary view similar to the previous view but shows the swingable foot in full section (as on the line 4) swung to the same position (as in Fig. 4) at an angle with the elongated screw fastened base. This temporary angular position of the swingable foot is effected by manually forcibly releasing a detent latching means formed between the stationary base and the swingable foot.

Fig. 6 is a fragmentary detailed view taken on the line 6, through the detent latching means, showing it in an unlatched position, i. e., the swingable foot is disengaged from the fixed screw fastened base and is in readiness to be swung out at the angle shown by dotted lines in Fig. 4 and by cross section in Fig. 5. Fig. 6 may be said to show the return movement of the swingable foot to the stationary base, where the detent boss and socket are about to snap-latch back into each other for setting the foot in its final permanent position shown in Figs. 1, 2 and 3, and as shown in cross section in Fig. 4.

This new outside screw fastening bracket or mounting means is of course intended for any suitable form of conventional mirror head 10 which usually comprises a reflecting mirror glass sealed in a backing plate. The mirror head 10 is secured through a conventional swivel boss 11 for focus adjustment on a supporting leg or what is usually called an arm 12 which may be formed hollow. The arm 12 is of sufficient length to provide clearance between the rim of the mirror head 10 and a mounting base next described and as observed in Figs. 1 and 2. The lower end of the mirror supporting arm 12 is integrally made with a long narrow hollow foot 13 having a toe 14 and a heel 15.

The foot 13 of the mirror bracket is swingably attached permanently to and is held in tight engagement at rest upon a base 16. This base (like the foot) is elongated in form as seen in the drawings and is of streamlined shape. The base 16 is reduced tapered rearwardly under and beyond the toe 14 and hence may be a little longer than the foot 13. The elongated stationary or fixed base may be a little wider than the swingable foot and its front end may terminate approximately at the heel 15. The foot 13 and base 16 blend into a single-piece appearance of attractive streamline form.

The flat-wing like streamline design of the arm 12, shown in Figs. 1 and 2, is one style of this new mirror manufactured for the trade. Other style design forms of the arm 12 with its integral foot 13 and focus-adjustable mirror head 10, are available and all of which (the different styles) are mounted on the standard form (one style) of screw fastened base 16. This feature relates to design appearance, as well as functional utility, a study of which will reveal this dual innovation. It is a dual feature which aids manufacturing economy, because it enables the factory to produce one standard part (the base 16) for a variety of re-styled mirror-arm heads 10, 12.

The screw fastened base 16 is usually die-formed and made hollow, the reference number 17 representing its hollow formation or underside elongated space. The base 16 is closed by side walls with ends and a top wall, but it is open at its bottom. By observing the arrow in Fig. 1, it is seen that Fig. 3 shows the open bottom edge of the base 16 in an upward position, but this is for the purpose of illustration.

One will understand that the mirror bracket is, of course, usually installed in a horizontal position, as in Fig. 1. A gasket 18 is usually interposed between the open bottom edge of the base 16 and the sheet metal of a car body B to protect the car finish and, moreover, provide a tight cushion seat of the mirror bracket against the sheet metal of the car body.

The hollow base 16 is formed with screw fastening apertures or wells 19 in spaced relation, two being sufficient. In this example of the invention, one screw hole 19 is near the front end of the base 16, and the other screw hole 19 is set back from the rear end of the base. In other words, looking at Fig. 3, it is seen that one screw hole is close to the heel 15 of the foot 13, and the other screw hole is close to the toe 14 of the foot. Thus the heel 15 covers one screw hole, and the toe 14 covers the other.

A self-tapping screw 20 extends through each screw hole well 19 and screws into the sheet metal of the car body B. The two screws 20 securely anchor the base 16 in a fixed or stationary position on the car body. The screws 20 are inserted from the outside and hence through the top wall of the base 16, it being unnecessary to work from the inside of the car body B with tools for securing the base 16 in a permanent stationary position seated on its cushioning gasket 18.

A bearing hole 22 is formed through the outside or top wall of the base 16 and thus opens into its underside space. In this example of the invention, it is seen that the bearing hole 22 is approximately in alignment with the rear edge of the arm 12 where the latter joins the foot 13 under the mirror head 10. A bearing pivot, such as a screw 23, is permanently mounted through the bearing hole 22 and fixed (screw fastened) into the foot 13. The pivot 23 need not have a close bearing fit with the bearing hole 22; a little clearance is shown.

The bearing pivot 23 is perpendicular to the longitudinal axis of the base 16 and permanently screw fastens into the foot 13 to swingably secure same (with its arm 12 and mirror head 10) onto the base in a way that permits the foot 13 to swing around the bearing pivot to a temporary position transversely of and at an angle to the stationary base. The swing of the foot 13, in relation to the stationary base 16, is shown in Figs. 4, 5 and 6.

A compression spring 24 is confined between the head of the pivot screw 23 and the inner surface of the top wall of the base 16. The spring 24 is under compression. A coil spring is suitable for this purpose. The result is that the bearing pivot 23 and its coacting spring 24 pull the adjacent longitudinal surfaces of the foot 13 and base 16 together in tight engagement. The compression of the spring 24 is set with sufficient tension or spring loading to quite firmly urge and set the swingable foot 13 under pressure against the outer top surface of the elongated base 16.

The spring-pivot means 23, 24 thus joins together the two separate members (arm 12 and base 16) with a finish and appearance which simulates a one-piece construction. The mirror bracket is permanently assembled at the factory in this fashion, i. e., with the foot 13 set in final position on the base 16 as in Figs. 1 and 2. The spring-pivot means 23, 24 is concealed and foolproofed against tampering or adjustment or take-apart within the hollow base and foot. The illustrated spring-loaded pivot-means is an example of one simple arrangement; other structural forms thereof may be used, but this was found to best serve the purpose.

A stop lug 25 is integrally formed on the outside top surface of the hollow base 16 and is concealed by and coacts with the hollow foot 13. In this instance, the stop lug 26 is disposed on the longitudinal axis of the base and close to the bearing pivot 23. By observing the stop lug 25 on the base (in Figs. 3, 4 and 5), it will be seen that it serves the purpose, in a simple way, of limiting the angular displaced swingable foot 13 on the base 16 to an outer position temporarily to uncover the two screw holes 19 during installation. This stop permits an adequate clearance swing of the foot 13 out of the way, when working with tools (such as a drill and screw driver) on the outside of the car body B and from the outside of the elongated base 16, when installing this new mirror bracket.

When displaced, one side wall or the other of the hollow foot 13 comes to rest against the concealed stop lug 25 (see Figs. 4 and 5). This stopping function occurs when temporarily swinging the foot 13 on the base 16 out of the way, while inserting the two screws 20 and driving them home into the sheet metal body B as shown in Fig. 3. The foot and arm 12, 13 swing under hand pressure, in either direction, at a small angle to the base 16 for temporarily uncovering the two screw holes 19.

In this type of new rearview mirror bracket construction, it is of further importance to provide a definite aligning and centering means by which the foot 13, when swung by hand pressure back into normal position, comes to a stopped rest in centered alignment on top of the screw fastened base 16. For this purpose, a spring-loaded detent latching means is provided, and the bearing pivot 23 and its compression spring 24 cooperate therewith and perform a new function in this art.

The example of detent latch shown herein comprises a detent socket 26 and a coacting detent boss 27 formed in the adjacently engaged relatively movable surfaces of the swingable foot 13 and stationary base 16. The boss and/or the socket may be formed in one or the other of the foot and the base. In this example of the mirror bracket, the socket 26 is in the foot, and the boss 27 in the base. This stopping latch 26, 27 appears in the last four views of the drawings.

It is observed that the detent latching stop means 26, 27 (in vertical cross section in Fig. 3) is in its engaged position to resiliently spring latch (under loading of the compression spring 24) the hollow streamlined foot 13 in final position on and in alignment with the base 16, as shown in the first four views. Now by comparing Fig. 3 with Fig. 6, it is seen that the latter view shows that the movable socket 26 (in the swingable foot 13) is out of engagement with the stationary boss 27 formed in the screw fastened base 16.

Accordingly, Fig. 6 aids in explaining that the foot 13 is forcibly swung by hand to its displaced angular position (Figs. 4 and 5), by simply gripping the base 16 with one hand and the mirror arm 12 with the other, by which to forcibly pivot the arm and foot 12, 13 to the temporary out-of-the-way position shown in Figs. 4 and 5 while installing (screw fastening) the base 16 on the car body B. After the latter is accomplished, the foot 13 is swung back to its final position on the base, and the detent 26, 27 snap-latches into final stopped position, as in Fig. 3 and other views.

The breadth of the flat wing-like mirror-supporting arm 12 is important functionally as well as for styling. Functionally, it enables a mechanic, when ready to install the mirror, to get a secure grip with one hand on the broad flat arm as he grips the long base 16 with his other hand, in order to apply torque to the arm and forcibly displace the swingable foot 13, by overcoming the compression of the spring 4, and releasing the movable detent socket 26. In this way, he temporarily uncovers the two screw holes 19 so as to insert the self-tapping screws 20 from and through the outside of the base 16.

The same leverage and gripping provision is true after the mechanic has finally mounted the base 16 in a secure and tight stationary position against the cushioning gasket 18 and upon the car body B. In other words, after the latter is accomplished, the aforementioned leverage and grip afforded by the wide arm 12, enable him to forcibly exert compression on the pivot spring 24 and return the swingable foot 13 into latched position, as shown in Figs. 1, 2, 3 and also in solid cross-section in Fig. 4.

In swinging (returning) the foot 13 back in final alignment onto the screw-fastened base 16, the latching socket 26 slides or cams upon the stationary boss 27 under yielding give of the compression spring 24. This action is aided by reason of the fact that the bearing pivot 23 has a sufficiently loose fit (clearance) in its bearing hole 22 as to permit the pivot to momentarily tilt or cant out of its perpendicular position. Such operating mode is understood by comparing Figs. 3 and 6 and observing the slight freedom of the pivot 23 confined within its bearing hole 22.

It is seen that the axis of the pivot 23 may be located about centrally of the foot 13, which disposes this pivot in approximate alignment with one edge, being the rear edge, of the wide and flat arm 12 where this edge integrally joins the foot. It is seen that the edge-to-edge width of the flat wing-like arm 12 possesses design appearance as well as mechanical advantages.

The detent latching means 26, 27 and the cooperating spring-pivot 23, 24 are spaced apart noticeably, a distance which is comparable, or is about equal, to the width of the flat wing-like mirror arm 12. This spaced relation enables one installing the mirror to gain a pivoting manual leverage against the compression spring 24, apply torque to the foot 13, and thus release and refasten the detent latch.

Such spaced relation between the detent latch and the spring pivot is a feature which enables the manufacturer of this mirror bracket to provide a stiff spring 24 which is set to give a substantial amount of compression. The result is that the compression-pivot 23, 24 and its detent latching means 26, 27 very securely anchors the swingable foot 13 onto the base 16 under such gripping compression that, after installation, there is little likelihood of the foot 13 and mirror head 10 ever becoming displaced from the base 16.

The supporting arm 12, with the mirror on its outer end and the foot 13 on its inner end, together with the base 16, taken all together, have the general appearance of a one piece construction, thus appearing to be conventionally screw fastened from the inside of the locked car door. Little or no trouble is experienced in theft of the mirror. The invention, therefore, provides what may be called a theft-proof appearance feature which, if discovered by a pilferer, still resists theft because the swingable foot 13 strongly resists displacement, and so the outside screws 19 remain permanently concealed.

From the foregoing, it is seen that the lug 25 constitutes an outer stop means to limit the temporary outer swing of the foot 13 to uncover the screw holes 19, and that the socket and boss 26 and 27 constitute an inner stop and latching means to limit the inner or return swing of the foot and secure it in final and normally seated position upon the base 16 for permanently covering the outside screws 20. These two cooperating stop means are importantly related to produce good results. While the outer limiting stop 25 may be less important, its use is recommended as a means to hold the foot 13 in steady outer position while mounting the outside attaching screws 20 through the base.

The particular location of the illustrated and described parts in relation to each other are not critical. Variations may be made and still provide a similar mode of operation and result. The example of the invention shown herein was found to be the better all round species for manufacture chosen out of other similar test models of equivalent form.

This disclosure explains the principles of the invention and the best mode contemplated in applying such principles, so as to distinguished the invention from others; and there is particularly pointed out and distinctly claimed the part, improvement or combination, which constitutes the invention or discovery, as understood by a comparison thereof with the prior art.

This invention is presented to fill a need for a new and useful rearview mirror. Various modifications in construction, mode of operation, use and method, may and often do occur to others, especially so after acquaintance with an invention. Accordingly, it is to be understood that this disclosure is exemplary of the principles herein and embraces equivalent constructions.

I claim:

1. In a rearview mirror and bracket means, of the type having an elongated base, which has an outer flat top surface, through which fastening apertures extend, adapted to be installed on a vehicle body, by inserting fastening screws from said outer flat top surface, through said fastening apertures, and screwing same into said vehicle body, thus not requiring access to the inside of said vehicle body when installing said rearview mirror, and said bracket means also having an arm, extending outward from said base, with a mirror head supported on the outer end of said arm, by a swivel-mount for focus adjustment manually in the usual manner, and having a foot including a toe and a heel on the inner end of said arm, and said foot having a bottom flat surface engaged and at rest upon the outer top surface of said elongated base; that improvement in said bracket means, which comprises a space provided on the underside of said elongated base, and a bearing hole extending outward from the underside space through said base toward said foot; a bearing pivot mounted in the bearing hole, an outer end on this bearing pivot, which is anchored to said foot, and which thus swingably connects said foot and arm with said base; an inner end on this bearing pivot, which is disposed within the underside space of said base; and spring means being mounted within the underside space, cooperating with and under compression against the inner end of the bearing pivot, thereby exerting a yielding inward pull on the bearing pivot, and thus gripping said swingable foot from toe to heel against said base; whereby said foot and arm are adapted to be swung manually on the bearing pivot to a temporary position, at an angle across said base, thus uncovering said fastening apertures, for the reception of said fastening screws, to secure said base on said vehicle body, and thereafter said arm and foot being swung back onto said base, into permanent position thereon, and covering said fastening screws, and lining up said foot and arm with said base on said vehicle body.

2. In a rearview mirror and bracket means, as described in claim 1, and having a further improvement comprising a detent latching means, on said base and foot, spaced from said bearing pivot, and disposed between the engaged surfaces thereof, thus concealed therebetween, and being latched under the compression of the spring means, the force of which sets the detent latching means in tight engagement, when said foot is swung into permanent position in alignment with said base.

3. In a rearview mirror and bracket means, as described in claim 1, and having further improvements, in that two said fastening apertures are provided, and the bearing hole and its bearing pivot are located therebetween; and said foot being of a length which disposes its toe over one of the fastening apertures and its heel over the other; whereby said foot and arm, when manually swung to the temporary position, dispose the toe on one side of said base with the heel on the other side thereof to uncover the two fastening apertures.

4. In a rearview mirror and bracket means, as described in claim 1, and having a further improvement, in that said arm is of wide and flat form with spaced edges, thus being of a width and thickness adapting it to be gripped from edge to edge by hand; and the bearing hole with its bearing pivot being disposed adjacent one edge of the arm; by which the hand grip on the wide and flat arm affords a twisting leverage applying torque thereto at the bearing pivot, for manually overcoming the compression of the spring means, when swinging said foot to its temporary position to uncover said fastening apertures and back into its permanent position to cover them.

5. In a rearview mirror and bracket means of the type having an elongated base, through which fastening apertures extend, adapted to be installed on a vehicle body, by inserting fastening screws through the fastening apertures and screwing same into said vehicle body, and said bracket means also having an arm, extending outward from said base, with a mirror supported on the outer end of said arm, by a swivel-mount for focus adjustment manually in the usual manner, and a foot on the inner end of said arm, resting upon said elongated base; the improvements in said bracket means which comprise said arm being made wide and flat, with front and rear edges, by which to obtain a hand grip thereon and around its edges; a bearing pivot mounted in said base, extending therefrom, through said foot, and into one edge of the wide and flat arm, by which the arm and said foot are swingably secured to said base, on an axis adjacent the one edge, thus in spaced relation from the other edge, with said foot covering said fastening apertures; a compression spring coacting with the bearing pivot, applying an axial force thereon which draws the foot against said base, whereby the hand grip on the wide and flat arm, at such other edge, provides a leverage against the compression spring and the bearing pivot, in order manually to swing said foot on the bearing pivot and against the compression spring, thereby swingably to displace said foot from said base, and thus temporarily to uncover said fastening apertures, for inserting said fastening screws therethrough and screwing same into said vehicle body; and a detent latching means coacting with said base and foot, spaced from the bearing pivot, and including a socket with a releasable latching boss in the socket, under compression of the spring, for holding said foot in permanent position on said base.

6. In a rearview mirror and bracket means, as described in claim 5, and having a further improvement, in that the detent latching means is disposed at that edge of said wide and flat arm which is opposite the edge where the bearing pivot has its axis, hence in spaced relation from the bearing pivot, and which is under the compression of the spring, the leverage of the hand grip on the wide and flat arm of which is increased by reason of such spaced relation, in order to apply sufficient torque on the arm to release the detent latching means, by which manually to swing said foot on the base temporarily to uncover said fastening apertures, and manually to swing said foot back upon the base again to fasten the detent latching means and permanently to cover said fastening apertures.

7. A reversing mirror comprising, in combination, an elongated base, having spaced-apart screw-holes, through which screws are inserted, from the outside of the base, and screwed into a car body, for installing said mirror thereof; a supporting arm, with a mirror on its outer end, also an elongated foot on its inner end, said foot being in normally seated position on said base, and permanently covering said spaced-apart screw-holes, as well as said outside screws therein; a spring-compression pivot-means swingably connecting said foot onto said base, whereby said foot may be temporarily swung relatively to said base for temporarily uncovering said spaced-apart screw holes, to permit permanently mounting said outside screws therein, when installing said mirror; a stop means, provided between said base and said foot, to limit said temporary relative swing, while installing said mirror; also a latching-stop means, provided between said base and said foot, spaced from the pivot means, and acted upon by said spring-compression, for securing said foot in its said normally seated position, when it is swung back onto said base, for permanently covering said outside screws.

References Cited in the file of this patent

UNITED STATES PATENTS

| | | |
|---|---|---|
| 1,844,675 | Oishei et al. | Feb. 9, 1932 |
| 2,364,165 | Sarnes | Dec. 5, 1944 |
| 2,450,179 | Anderson | Sept. 28, 1948 |
| 2,452,316 | Moreley | Oct. 26, 1948 |
| 2,473,698 | Aves | June 21, 1949 |
| 2,533,475 | Koonter | Dec. 12, 1950 |
| 2,671,630 | Whitehead | Mar. 9, 1954 |